United States Patent Office 3,015,183
Patented Jan. 2, 1962

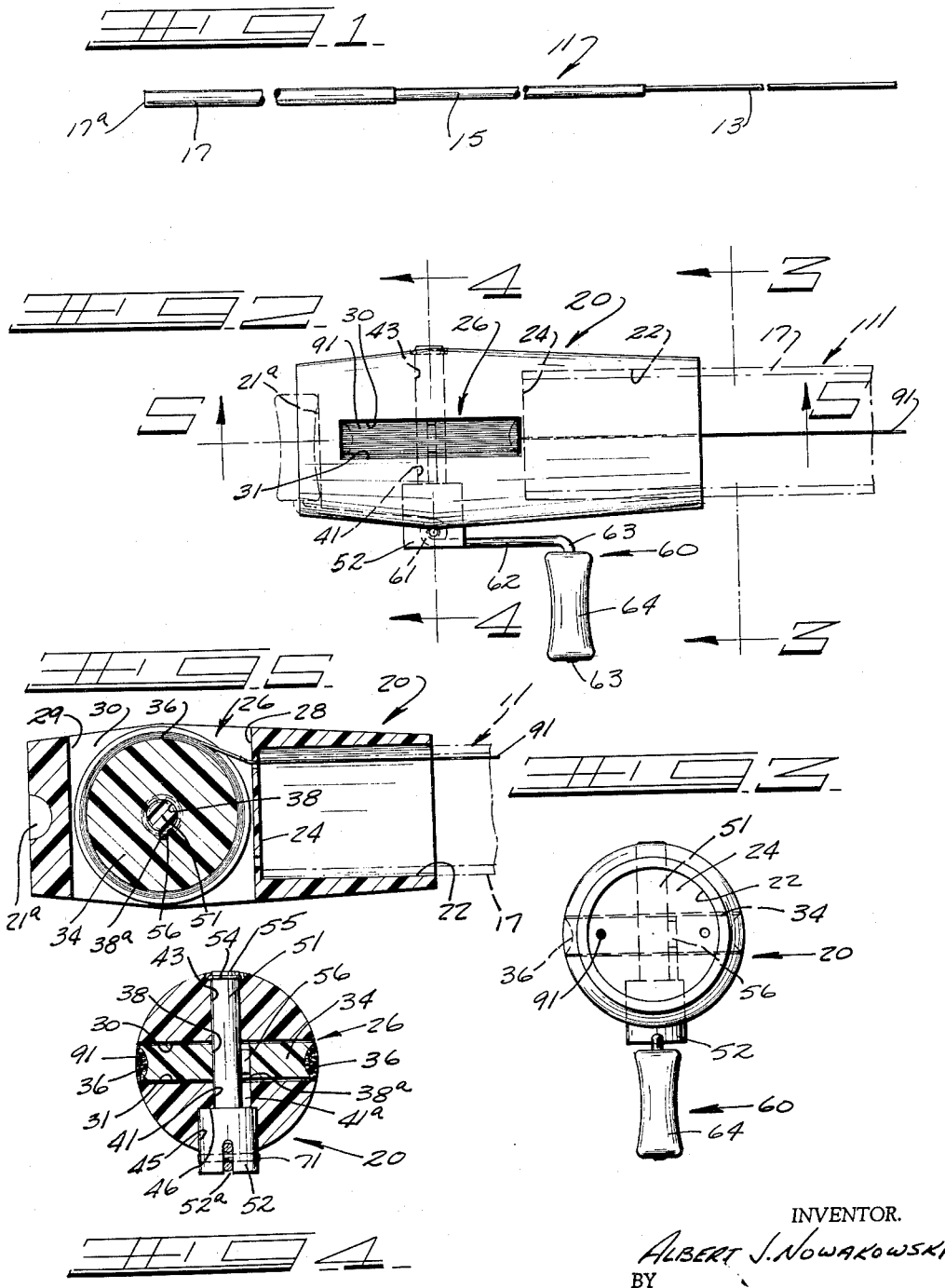

1

3,015,183
FISHING LINE RESERVOIR
Albert J. Nowakowski, Toledo, Ohio, assignor to The Still Fish Reel Company, a partnership
Filed May 27, 1959, Ser. No. 816,311
2 Claims. (Cl. 43—20)

The present invention relates to the sport of fishing, and, particularly, to a novel device for storing a supply of fishing line.

The device of the invention finds particular application in combination with the tubular, hollow fishing poles or rods used widely in "still" fishing. These fishing poles are usually formed of several lengths connected in telescoping relationship. Rods of the telescoping type are manufactured by such manufacturers as Orchard Industries, Hastings, Michigan, who make rods under the trade name "Actionrod" and "Extendo," and the South Bend Tackle Company, South Bend, Indiana. The most preferred and desirable of these rods consist of bundles of Fiberglas linearly disposed in a plastic matrix, e.g., usually a polyester resin. U.S. Patent 2,571,692 discloses a rod of this general type. The rods described are desired because of their combination of strength and flexibility which simulate and, in fact, improve on the action of natural bamboo. The hollow character of the rods adds to their lightness, and also serves as an internal passageway for line.

The most inconvenient feature encountered in the use of these rods is the matter of connecting the fishing line thereto. Usually, a length of line is merely tied to the rod, and is removed after the day's fishing, so that the rod can be telescoped into its reduced size for ease of transportation. This, of course, limits the fisherman as to depth of fishing and distance out from the boat or shore. If the rod and line are retained connected together, then, the problems of risk of tangling must be expected as the rod is telescoped. The various hooks, leaders, weights, bobbers, etc., accentuate the problem both of snags and that of securing the line and the other items to the pole. The problem is further accentuated where the angler desires to keep a sufficient supply of line on the rod so that there will be sufficient length to accommodate any depth which he may encounter. Thus, the extra length must be wound on the rod in some fashion, usually the rear or butt end so as not to upset the balance of the pole. This is far from neat, however, and, as indicated, further increases the possibilities of snags, etc.

One scheme for attempting to solve these problems is disclosed in U.S. Patent 2,808,676. This patent proposes a construction employing a reel similar to those used in casting rods. In addition, it proposes a sleeve member for the rear end of a hollow rod, the sleeve including a rear plate having a hole and side passageway. Line passes down the rod, out the hole, and reversely up the side passageway from which the line passes to the reel clamped to the rod. Unfortunately, this scheme obviously necessitates exposure of the line at the rear end. Consequently, friction and wear result. Also, the reel is clumsy in its exterior position, and detracts from the angler's attempt to enjoy the popular cane-pole-type fishing.

With the foregoing introduction, it may be stated that an object of the present invention is to provide an accessory for a hollow tubular fishing pole which is of utility in storing in convenient fashion an ample supply of line for accommodating any situation encountered by the angler.

It is likewise an object of this invention to provide a device of the character described which is capable of conveniently dispensing line from the storage space or reservoir, and also retrieving line extending from the pole in fishing position.

2

It is still another object of the present invention to provide a device of the character described which is easily assembled with a hollow-type fishing rod, and is of itself of novel, simple design and construction.

It is also an object of this invention to provide a fishing pole accessory of the type described which is tubular in shape and includes a rotatable reel member within its confines such that it is not evident from a casual glance, and, in addition, is not bulky, complicated, or a hindrance in the handling of the rod in carrying out the sport of fishing.

Basically, the present invention comprises a shell-like member telescopically and snugly engageable with the rear end of a hollow, linear fishing pole, said shell member having rotatably mounted within the surface confines of its exterior surface, a circular reel element having a crank arm for rotation of said reel as desired, and said reel being in communication with said hollow portion of said pole, whereby line does not pass outside of said pole or said shell member assembly.

The foregoing and other objects of the present invention will become apparent to those skilled in the art from the following detailed description, taken in conjunction with the annexed sheet of drawings, on which there is presented for purposes of illustration only, a single embodiment of the fishing pole accessory of this invention.

In the drawings:

FIG. 1 is a side elevation view, with sections broken away, of a hollow, linear fishing pole or rod, and, particularly, of the three-section, telescopically-connected variety.

FIG. 2 is a top plan view of the device of the present invention in assembled relationship with the rod shown in FIG. 1, said rod being shown in broken lines.

FIG. 3 is a sectional view taken on the line 3—3 in FIG. 2.

FIG. 4 is a sectional view taken on the line 4—4 in FIG. 2.

FIG. 5 is a sectional view taken on the line 5—5 in FIG. 2.

Referring now more specifically to the drawings, there is disclosed in FIG. 1 a fishing pole 11, composed of a tip end 13, a middle portion 15, and a butt or rear end 17. In the order just listed, each of the sections is slightly larger in diameter, and each is hollow so that they may be telescopically connected together. In FIG. 2, the rod 11 is shown in combination with the shell-like accessory 20 of the present invention. The device 20 is generally tube-like, and has a smooth symmetrical contour. In particular, the rear end 17 (shown dotted) of the pole is snugly received in an axial bore 22 in the foreward end of the shell 20. The bore terminates in a wall 24, against which the extremity 17a of the rear end 17 rests and abuts. Just to the rear of the wall 24, the shell is provided with a rectangular bore 26. The bore is defined by foreward wall surface 28, rear wall surface 29, and spaced side walls 30 and 31. Looking into the rectangular bore as in FIG. 2, the side walls are spaced closer together than the fore and rear walls. The rectangular bore extends all the way through the shell member 20 in traversing relationship. The rectangular bore 26 defines a chamber which is open at both ends and is capable of receiving a circular reel element 34. The thickness of the reel element is just less than the distance between the side wall surfaces 30 and 31 so that the reel element will fit snugly therein but will slide for ease of assembly and for free rotation as described hereinafter. The reel element 34 is provided with a continuous recess 36 in the periphery thereof, and also contains a central axial hole 38 which is, in addition, provided with a key-way slot 38a for a purpose to be explained hereinafter.

To aid in mounting the reel element in the rectangular chamber 26, the shell 20 is provided with bored holes 41 and 43 disposed normal to the bore 26 (FIGS. 2 and 4). The holes 41 and 43 are in alignment, and the hole 41 is enlarged for a portion of its length as at 45 to provide a shoulder 46. The hole 41 also is provided with a key-way slot 41a. Shaft or pin 51 is snugly but rotatably received in the holes 41 and 43 in the shell member and hole 38 in the reel element, and thus carries the reel element in fixed, mounted relationship within the chamber 26, as described above. One end of the shaft 51 is enlarged sharply as at 52 to define a shoulder 52 which abuts against the shoulder 46 formed on the shell member 20. The shaft is held in combination with the shell by a split ring 54 which snaps over the end 55 in a recess (not shown) therein. The contact of the shoulders and the split ring cooperate to provide a simple scheme for holding the shell member 20, reel 34, and shaft 51 in secure, assembled relationship. The shaft 51 includes a projection or key 56 midway between the ends thereof. The key 56 passes through the key-way slot 41a into key-way slot 28a in the reel element 34 as the shaft 51 and reel 34 are assembled with the shell 20, and thus engages the reel element 34 as the shaft 51 is rotated, to thereby rotate the reel element 34.

In order that the shaft 51 may be rotated, it is provided with a crank arm 60. The crank 60 is connected to the shaft 51 at the enlarged end 52. The extremity of the enlarged end is provided with a groove 52a through which a pin 71 passes. The end 61 of the crank arm 60 is bent around the pin 71 as shown in FIG. 2. The other end 63 of the crank arm is bent normal to the central length 62, and has mounted thereon a rotatable, cylindrical sleeve 64 which is in offset, parallel relationship with the shaft 51. The connection between the end 61 and the pin 71 as described permits the crank arm 60 to pivot from the position shown in full line in FIG. 2 to the position shown in dotted line in the same figure. To accommodate the sleeve and end conveniently, the rear end of the shell 20 is cut away slightly as at 21a.

The reel element 34 has wound thereon a continuous length of fishing line 91 which fits into the recess 36. The end of the line is conveniently attached to the root of the recess in permanent fashion by applying heat to the end to bring the line made of plastic to the softening point momentarily so that when it resolidifies it attaches to the bottom surface of the recess 36. The reel element itself is desirably fabricated of a thermoplastic material such as a vinyl, which has a softening point similar to that of the line so as to aid in the connection of the line to the reel element. The line 91 wound in the recess 36 also extends through one or the other of the apertures in the wall 24 (see FIG. 3). As shown in this figure, the line extends through the small aperture on the left (the filled aperture) and having the reference numeral 91 connected thereto by a lead line. In assembled relationship this is the top half of the accessory with the handle 60 on the right for a right handed fisherman. For a left handed fisherman, the line would be put through the small aperture on the right in FIG. 3. This would make that half of the accessory the top with the handle 60 on the left side.

The shell member 20 is fabricated of an impact-resistant plastic such as a filled alkyd, phenolic, or the like.

As will be appreciated from the foregoing description, the elements which make up the accessory device of the invention may be easily assembled together in operative relationship. The device is preferably marketed with the line attached as described above. Then, all the purchaser needs to do is to thread the line through the hollow fishing pole sections and the device slid on the butt end of the rod. The rod fits snugly in the bore as described hereinabove, and nothing is needed to further attach the device to the rod. When the pole and accessory are in assembled fishing relationship, the length of line needed for the particular fishing circumstances encountered may be withdrawn from the reel element by moving the crank arm to the operative position and pulling on the other end of the line. Conversely, the length of line may be shortened, as desired, by turning the crank to reel in line, after which the crank arm may be pivoted to the retracted out of the way position. This also locks the reel element to prevent any rotating thereof and any change in the length of the line. When the fishing tour is completed, the accessory constituting the present invention is a useful aid in bringing the rod into telescoped secure position. First, the hook is secured to the rear end of the rod. A rubber band tightly encircling the rod near the rear end provides a convenient arrangement for engaging the hook. It is also possible to secure the hook against the forward wall 28 of the chamber containing the reel element. Then, one need only reach up and loosen the joint between the section 17 and the middle section 15, whereupon the handle may be rotated. This will reel in line, but, as the hook is held firmly, the result will be that the middle section will telescope within the butt end section 17 and bring the joint between the middle section and the tip end section closer to the fisherman. Then, in like fashion, the fisherman need only reach up and loosen the last-mentioned joint and reel in as before to telescope the tip end section into the middle section already within the butt end section. When this is completed, the handle may be pivoted to locking position, and the equipment will be secure until the next time. The feature just described is particularly advantageous and desirable where the fishing is being conducted from a boat where space is at a premium. Usually, the rod has to be extensively manipulated in order ot get the gear collapsed and put into secured relationship.

It will be appreciated that once the accessory of the present invention is assembled with a hollow, tubular fishing pole or rod, it may be kept or maintained in such assembled relaitonship premanently, and need not be disassembled inbetween times of use. The compactness and smooth contour provides complete unobtrusiveness in the assembled form. Obviously, of course, the simple manner of attachment, namely, the telescoping, frictional engagement, will permit the user to remove the accessory, if desired, by simply removing the hook from the line, reeling the line in, and pulling the accessory off the butt end of the rod.

Modifications will suggest themselves to those skilled in the art from the foregoing descriptions, and it is, therefore, intended that all such obvious equivalents and modifications shall be included within the spirit and scope of the present invention as defined in the appended claims.

I claim:

1. A fishing line reservoir accessory for a fishing pole having an axial passageway for said line to extend from one end to the other end of said pole, said accessory comprising, (1) a one-piece, molded, plastic shell formed with an axial bore in one end thereof to receive said pole and with a relatively thin rectangular aperture therethrough at the rear of said bore, said shell having an integrally formed, recessed, transverse wall separating the foreward axial bore from the relatively thin rectangular aperture, said bore snugly but slidably receiving the rear end of said pole in abutting relationship with said wall, said aperture extending from one side of said shell to the other side in normal relationship to the axis of said shell, said wall containing a hole connecting said axial bore and said rectangular aperture, (2) a relatively thin, circular, molded plastic reel element having a diameter not greater than the diameter of said shell proximate said aperture, said reel element being snugly but easily rotatably received in said aperture and including a continuous peripheral recess for a supply of line wound therein, (3) a plastic shaft means rotatably mounted in said shell centrally located and normal to said aperture, said shaft engaging and carrying said reel element, one end of said shaft protruding slightly from said shell, and (4) an L-shaped handle engaging said protruding end of said shaft for rotating said reel to wind up line extending through said pole passageway and through said hole in said wall.

2. The accessory as claimed in claim 1, wherein, (1) the shaft has one end of larger diameter than the remainder thereof forming a shoulder and said shell has a corresponding recess to abut and support said shoulder providing improved bearing support, (2) the handle is pivotably mounted on said protruding end of said shaft, and (3) said shell has a grooved recess at its rear end opposite said bore-containing end, to receive and lock said handle to prevent rotation of said reel.

References Cited in the file of this patent

UNITED STATES PATENTS

| | | |
|---|---|---|
| 412,629 | Kepler | Oct. 8, 1889 |
| 2,402,882 | Garr | June 25, 1946 |
| 2,640,661 | Lee | June 2, 1953 |
| 2,957,264 | Ruff | Oct. 25, 1960 |

FOREIGN PATENTS

| | | |
|---|---|---|
| 44,567 | France | Dec. 5, 1934 |